United States Patent
Hottinen et al.

(10) Patent No.: US 6,611,507 B1
(45) Date of Patent: Aug. 26, 2003

(54) SYSTEM AND METHOD FOR EFFECTING INFORMATION TRANSMISSION AND SOFT HANDOFF BETWEEN FREQUENCY DIVISION DUPLEX AND TIME DIVISION DUPLEX COMMUNICATIONS SYSTEMS

(75) Inventors: Ari Hottinen, Espoo (FI); Marko Teittinen, Espoo (FI); M. Oguz Sunay, Morris Plains, NJ (US)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/364,523

(22) Filed: Jul. 30, 1999

(51) Int. Cl.[7] .................................................. H04Q 7/00
(52) U.S. Cl. ................... 370/331; 370/280; 370/281; 370/294; 370/295; 455/436; 455/439; 455/442
(58) Field of Search .................................. 370/280, 281, 370/294, 295, 331, 332, 328, 329, 310.2; 455/436, 437, 438, 439, 442, 422, 403, 440, 444

(56) References Cited

U.S. PATENT DOCUMENTS

| | | | | |
|---|---|---|---|---|
| 5,722,074 A | * | 2/1998 | Muszynski | 370/331 |
| 5,848,063 A | | 12/1998 | Weaver, Jr. et al. | |
| 5,850,607 A | * | 12/1998 | Muszynski | 455/436 |
| 5,883,888 A | * | 3/1999 | St-Pierre | 370/331 |
| 6,009,328 A | * | 12/1999 | Muszynski | 455/436 |
| 6,094,427 A | * | 7/2000 | Yi | 370/331 |
| 6,256,501 B1 | * | 7/2001 | Tokuyama et al. | 455/437 |
| 6,351,458 B2 | * | 2/2002 | Miya et al. | 370/330 |

FOREIGN PATENT DOCUMENTS

| | | |
|---|---|---|
| WO | WO 95/10922 | 4/1995 |
| WO | WO 96/23369 | 8/1996 |
| WO | WO 96/25015 | 8/1996 |
| WO | WO 97/40592 | 10/1997 |

OTHER PUBLICATIONS

Whinnett NW, "Handoff Between Dissimilar Systems: General Approaches and Air Interface Issues for TDMA Systems", Proceedings of the Vehicular Technology Conference, US, New York, IEEE, Jul. 25, 1995.

(List continued on next page.)

Primary Examiner—Nay Maung
Assistant Examiner—Sonny Trinh
(74) Attorney, Agent, or Firm—Squire, Sanders & Dempsey LLP (57) ABSTRACT

A system and method for controlling information transmission and communication handoff between frequency division multiplexing (FDD) and time division multiplexing (TDD) communication systems using any multiple access scheme is provided. The mobile unit transmits information via a current one of the FDD and TDD communication systems while it moves toward the other, or targeted one of the FDD and TDD communication systems. A pilot search signal is generated by the targeted communication system, where the pilot search signal corresponds to a transmission range of the targeted communication system. A communication handoff is initiated from the current communication system to the targeted communication system when the mobile unit recognizes a predetermined threshold level of the pilot search signal. Concurrent communications are synchronized and temporarily maintained between the mobile unit and both the current and targeted communications systems using an increased data rate for each of the communications links. When the handoff is complete, transmission between the mobile unit and the current communication system is terminated, while communication between the mobile unit and the targeted communication system is maintained when the handoff is complete.

46 Claims, 8 Drawing Sheets

OTHER PUBLICATIONS

"Multiple Access Options for Cellular Based Personal Communictions"; Eriksson et al.; pps. 593–597.

"Principles of CDMA"; Internet site located at http://www.cdg.org/a_ross/Principles.html ; last updated Jun. 16, 1996; 4 pages.

"The CDMA Revolution", internet site located at http://www.cdg.org/a_ross/CDMARevolution.html; last updated Jul. 10, 1996; 7 pages.

"Introduction to CDMA", internet site located at http://www.cdg.org/a_ross/intro.html; last updated Jul. 10, 1996; 4 pages.

"GL6880 Wireless Line Extender Product Guide"; internet site located at http://www.glenayre.com/products/rrts/gl6880html/gl6880–2.html; May 1996; 5 pages.

"Handoff"; internet site located at http://www.cdg.org/a_ross/Handoff.html; last updated Jun. 28, 1996; 8 pages.

* cited by examiner

SYSTEM AND METHOD FOR EFFECTING INFORMATION TRANSMISSION AND SOFT HANDOFF BETWEEN FREQUENCY DIVISION DUPLEX AND TIME DIVISION DUPLEX COMMUNICATIONS SYSTEMS

FIELD OF THE INVENTION

The present invention relates generally to communications systems. More particularly, this invention relates to a system and method for controlling information transmission and communication handoff between frequency division multiplexing and time division multiplexing communication systems using any multiple access scheme.

BACKGROUND OF THE INVENTION

The modern communications era has brought about a tremendous proliferation of wireline and wireless networks. Computer networks, television networks, and telephony networks in particular are experiencing an unprecedented technological expansion, fueled by consumer demand. The ever-increasing need for transportation, due in part to the expansion of the world-wide market and the popularity of suburbia, has led to an increased use of automobiles and airplanes for business and pleasure. The desire to maintain the ability to communicate, even while away from the home or office, has driven the wireless communication market to a large extent. One response to this demand was the mobile/wireless telephone network.

The demand by consumers all over the world for mobile communications is expanding at a rapid pace and will continue to do so for at least the next decade. Over 100 million people were using a mobile service by the end of 1995, and that number is expected to grow to 300 million by the year 2000. Several factors are contributing to the exciting growth in the telecommunications industry. For example, a combination of technology and competition bring more value to consumers. Phones are smaller, lighter, have a longer battery life, and are affordable now for the mass market. Operators are providing excellent voice quality, innovative services, and roaming across the country or world. Most important, mobility is becoming less expensive for people to use. Around the world, as well as in the United States, governments are licensing additional spectrum for new operators to compete with traditional cellular operators. Competition brings innovation, new services, and lower prices for consumers.

Cellular telephone communications systems allow users of cellular telephones to be connected to other cellular telephone users, as well as being connected to the conventional landline Public Switched Telephone Network (PSTN). Cellular telephones work by dividing geographical areas into "cells". Each cell includes a base station, which typically contains a transceiver, antenna, and dedicated lines to a Mobile Telephone Switching Office (MTSO). Adjacent cells may utilize different radio frequencies in order to prevent interference between the adjacent cells.

In TDMA or FDMA systems it is customary that each cell has at least one setup channel dedicated to signaling between the cell and cellular units within each cell, while the remaining channels are used for conversation. Each frequency channel may be re-used between cells, as long as the re-used channels are not in adjacent cells, and are far enough apart to avoid excessive interference. A network with a relatively small number of subscribers can therefore use large cells, and as demand grows, the cells may be divided into smaller cells.

Accordingly, in cellular networks, calls have to be passed as the vehicle or mobile unit moves from one cell to another. This is referred to as "handoff" or "handover". As a vehicle moves away from a base station, its signal strength decreases. While handoff is often implemented in mobile systems because of mobility of the users, there are other reasons for implementing a handoff. For example, a stationary terminal may perform a handoff to utilize a different resource where the alternative resource is preferred, such as in the case of an imbalance in the system load, better efficiency in the alternative resource, signal quality, ownership of resources, forced handoff, and the like.

The base station monitors the signal strength during the duration of the call. When signal strength falls below a predetermined threshold level, the network makes a request to all predetermined neighboring cells to report the signal strength of the mobile station in the vehicle. If the signal strength in the neighboring cell is stronger by a predetermined amount, then the network attempts to handoff the call to the neighboring cell.

The manner in which handoff occurs, and the relative quality of the handoff, depends largely on the channel access method utilized. These access methods are used to increase the traffic-carrying capacity and to provide access to that capacity. Many different access methods have been employed, including Frequency Division Multiple Access (FDMA), which divides the capacity into multiple frequency segments between end points. Time Division Multiple Access (TDMA) is another access method, which uses the concept of time sharing the total capacity. Still another access method is Code Division Multiple Access (CDMA), which may be based on the IS-95 industry specification. IS-95 CDMA combines new digital spread spectrum CDMA and advanced mobile phone service (AMPS) functionality into one dual-mode cellular telephone on the 800 MHz band, and can use a CDMA-only handset on the 1.9 GHz PCS band.

CDMA systems primarily differ from FDMA (Analog) and TDMA systems through the use of coded radio channels. In a CDMA system, users can operate on the same radio channel simultaneously by using different coded sequences. IS-95 CDMA cellular systems have several key attributes that are different from other cellular systems. The same CDMA radio carrier frequencies may be optionally used in adjacent cell sites, which eliminates the need for frequency planning.

In AMPS cellular systems, handoff occurs when the base station detects a deterioration in signal strength from the mobile station. As AMPS subscribers approach handoff, signal strength may vary abruptly and the voice is muted for at least 200 milliseconds in order to send control messages and complete the handoff. In contrast, CDMA uses a unique soft handoff, which is nearly undetectable and loses few if any information frames. As a result, CDMA's soft handoff is much less likely to lose a call during handoff.

For providing duplex communication, transmission techniques such as Time Division Duplex (TDD) and Frequency Division Duplex (FDD) have been used. FDD provides for forward link (downlink) and reverse link (uplink) channel communications in different frequency bands. In TDD, a single channel is shared in time to carry both the transmit and receive information virtually simultaneously to achieve full duplex operation. Typically, FDD is used in outdoor systems, and TDD is used in indoor systems, or whenever local coverage is needed, due to the slow varying nature of the propagation channel and channel reciprocity.

TDD and FDD are currently not utilized in the same system. As previously described, CDMA systems, for example, use a "soft handoff", which is a call state where two or more base stations support a mobile station. This, however, differs from a handoff between a TDD and an FDD system. In future systems, TDD and FDD may be optional features of one system. Therefore, there is a need to support handoffs between TDD and FDD systems in a wireless environment. The present invention provides for seamless handoff between TDD and FDD systems, and offers other advantages over the prior art.

SUMMARY OF THE INVENTION

The present invention is directed to a system and method for controlling communication handoff between frequency division multiplexing and time division multiplexing communication systems using any multiple access scheme.

In accordance with one embodiment of the invention, a method for controlling mobile unit communication handoffs between a frequency division duplex (FDD) communication system and a time division duplex (TDD) communications system is provided. The mobile unit transmits information via a current one of the FDD and TDD communication systems while it moves toward the other, or targeted one of the FDD and TDD communication systems. A pilot search signal or any other cell identification signal is generated by the targeted communication system, where the pilot search signal corresponds to a transmission range of the targeted communication system. A communication handoff is initiated from the current communication system to the targeted communication system when the mobile unit recognizes a predetermined threshold level of the pilot search signal. Concurrent communications are synchronized between the mobile unit and both the current and targeted communications systems. When the handoff is complete, transmission between the mobile unit and the current communication system is terminated, while communication between the mobile unit and the targeted communication system is maintained when the handoff is complete.

In accordance with another embodiment of the invention, the synchronization includes an initial synchronization of the handoff, and further includes temporary operation in a multirate mode. The initial synchronization includes increasing the data rate during an uplink frame with the system currently in operation, while transmitting a synchronizing preamble to the targeted communication system in the remaining uplink frame time which was made available by the increased data transfer rate with the current communication system. Communications enters the multirate mode upon acknowledgment of the synchronization by the targeted communication system. The multirate mode includes communicating the information with the current communication system at an increased data rate in the uplink frame, and concurrently communicating the information with the targeted communication system at an increased data rate in a remaining portion of each uplink frame.

In accordance with another aspect of the invention, a system for managing mobile unit communication handoffs between a frequency division duplex (FDD) communication system and a time division duplex (TDD) communication system is provided. An FDD base station is provided within the FDD communication system for communicating with the mobile unit in frequency division duplex mode, and for generating a pilot search signal corresponding to a transmission range of the FDD communication system. A TDD base station is provided within the TDD communication system for communicating with the mobile unit in time division duplex mode, and for generating a pilot search signal corresponding to a transmission range of the TDD communication system. A mobile unit transmits information via a current one of the FDD and TDD communication systems while moving towards the other, or targeted one of the FDD and TDD communication systems. The mobile unit includes a receiving unit to receive the first and second pilot search signals, and to initiate a handoff from the current communication system to the targeted communication system when the pilot search signal from the targeted communication system has reached a predetermined threshold level. The mobile unit further includes a dual-transceiver to synchronize concurrent communications between the mobile unit and the current and targeted communication systems, and to concurrently communicate the information with the current communication system and the targeted communication system upon synchronization. The dual-transceiver includes a burst mode capable of increasing a data rate between the mobile unit and the current and targeted communication systems during the handoff to concurrently support communication with both the current and targeted communications systems.

In accordance with another aspect of the invention, a method for maintaining a connection between a frequency division duplex (FDD) communication system and a time division duplex (TDD) communication system during handoff of a communication unit from one communication system to the other is provided. The method includes transmitting a first portion of a communication frame to one of the FDD and TDD communication systems, and transmitting a second portion of the communication frame to the other one of the FDD and TDD communication systems. At least one of the first and second portions of the communication frame is transmitted at an increased data rate. The communication occurs with both the FDD and TDD systems during the transmission of the communication frame, and the communication occurs in a time equivalent to the time required to transmit the communication frame to either of the FDD and TDD systems when no handoff is occurring.

In accordance with yet another embodiment of the invention, a method is provided for controlling information transmissions between a communications unit and both frequency division duplex (FDD) and time division duplex (TDD) communication systems. The communication unit is transmitting information via a first one of the FDD and TDD communication systems, and a cell identification signal is generated which corresponds to a transmission range of the other one of the FDD and TDD communication systems. Substantially simultaneous communication is initiated between the communications unit and both the FDD and TDD communications systems when the communications unit acknowledges the cell identification signal and is thereby in the coverage area of both the FDD and TDD communications systems. The substantially simultaneous communication between the communications unit and each of the FDD and TDD communications systems is maintained by simultaneously communicating at least a part of the information with each of the FDD and TDD communications systems.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which.

DETAILED DESCRIPTION OF THE ILLUSTRATED EMBODIMENTS

In the following description of the exemplary embodiments, reference is made to the accompanying drawings which form a part hereof; and in which is shown by way of illustration the specific embodiment in which the invention may be practiced. It is to be understood that other embodiments may be utilized, as structural changes may be made without departing from the scope of the invention.

The present invention provides a system and method for controlling information transmission and communication handoff between frequency division multiplexing and time division multiplexing communication systems using any multiple access scheme. This provides a means for a user of a mobile communications station to send and receive information to two systems, where one system utilizes frequency division duplex and the other utilizes time division duplex. The present invention therefore provides a means for operating under the control of a first of the duplex systems, synchronizing a handoff from the first to the second duplex system, temporarily communicating with both the first and second duplex systems during the handoff using increased data transfer rates, and finally maintaining operation with the second of the duplex systems.

Figure 1:
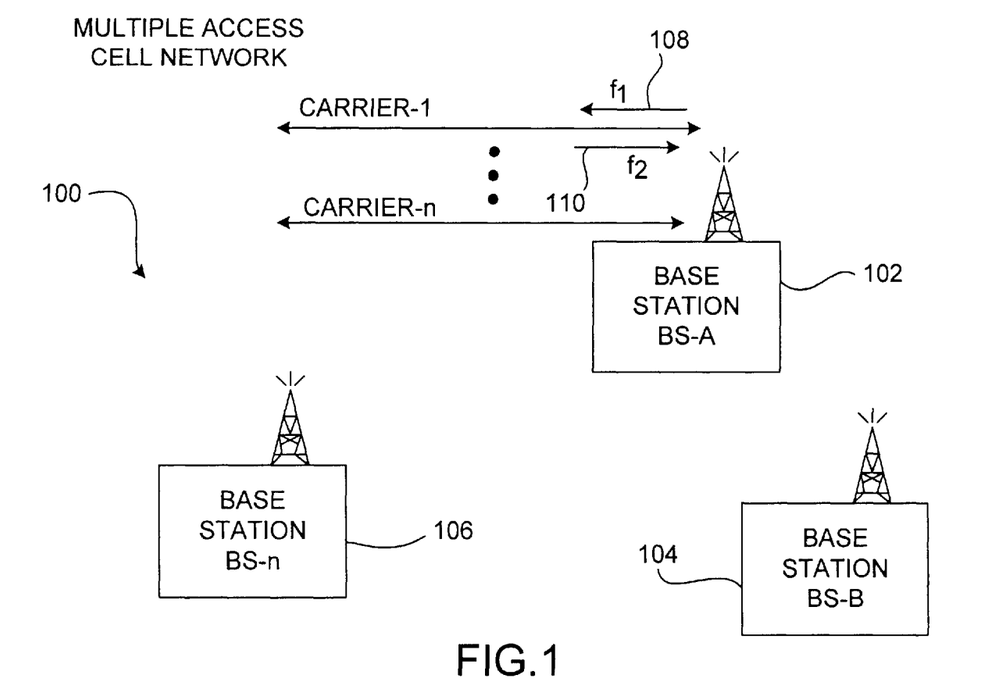
FIG. 1 is a diagram depicting a multiple access cell network utilizing frequency division duplex (FDD) multiple accessing.

Referring now to FIG. 1, a multiple access cell network 100 utilizing frequency division duplex (FDD) multiple accessing is illustrated. The illustrated cell network 100 includes a plurality of base stations (BS) labeled base station BS-A 102, BS-B 104, through base station BS-n 106. Each of the base stations in the cell network 100 implement FDD multiple access techniques. For example, base station BS-A 102 is shown having a plurality of frequency carriers labeled carrier-1 through carrier-n, wherein each of the carriers includes an FDD paired frequency bands shown as frequency band $f_1$ and $f_2$ on directional lines 108 and 110 respectively. The FDD system allows duplex operation using the two frequency bands $f_1$ and $f_2$. FDD multiple access cell networks such as the cell network 100 have typically been used in outdoor macro cell networks, and is a desirable technology for long range communications with lower bit rates.

Figure 2:
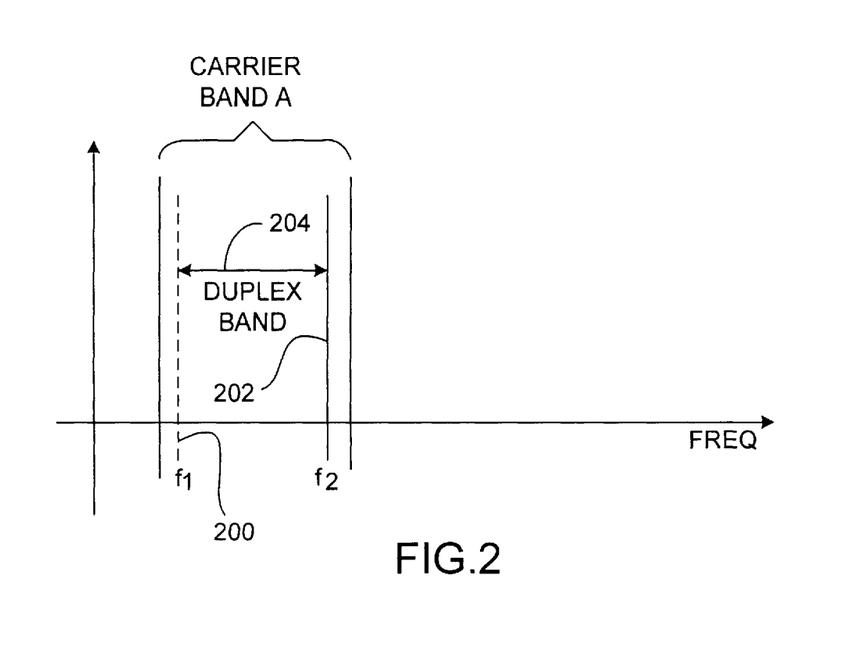
FIG. 2 illustrates the frequency characteristics of an FDD-paired frequency band.

Referring now to FIG. 2, the frequency characteristics of an FDD paired frequency band are shown. Each carrier band, such as carrier band A, includes a frequency range from which an FDD duplex communication occurs. The uplink frequency $f_1$ is represented by the frequency on line 200, and the downlink frame takes place at a frequency $f_2$ represented by line 202. The frequency range separating the uplink and downlink frequencies is shown as the duplex band 204. Duplex communication is allowed by simultaneously providing communication uplink from the mobile station to the base station via frequency $f_1$, and downlink communication from the base station to the mobile station at frequency $f_2$.

In addition to the FDD multiple access protocol is the time division multiplex (TDD) wireless communication protocol. TDD allows for duplex communication in a single wireless communication channel using time division multiplexing techniques. FDD systems require two separate frequencies in order to provide full duplex service, where one frequency transmits and one receives. TDD, on the other hand, allows a single channel to carry both the transmit and receive information virtually simultaneously.

Figure 3:
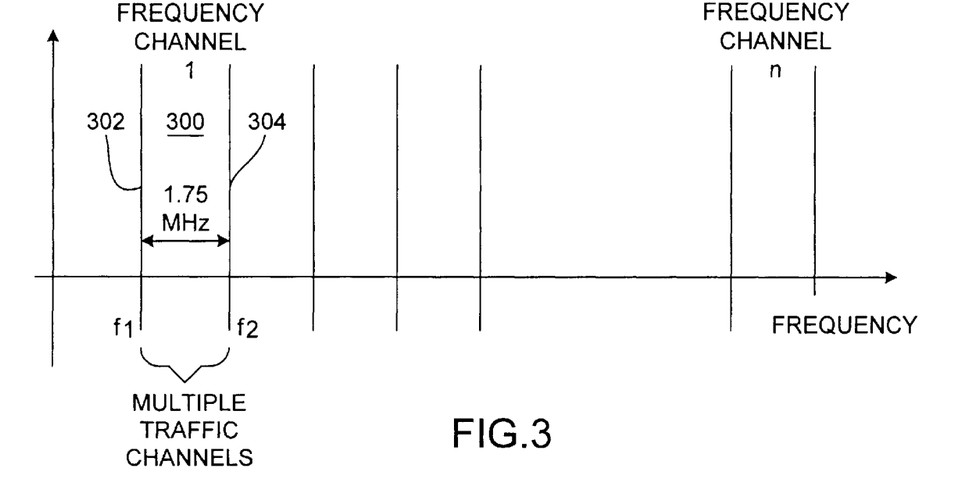
FIG. 3 illustrates one possible time division duplex (TDD) configuration where "n" frequency channels provide for time division duplex communication.

FIG. 3 illustrates one possible TDD configuration whereby "n" frequency channels provide for time division duplex communication. Frequency channel-1 300 is illustrated as having an approximately 1.75 MHz frequency bandwidth, delineated by frequencies $f_1$ and $f_2$ on lines 302 and 304 respectively. Within the frequency channel-1 300 is a transmit and receive path for information transfers on the common frequency channel. The transmit and receive information is transmitted at different-timeslots to provide full duplex operation. Within each frequency channel, multiple information traffic channels can exist, whereby each traffic channel incorporates a TDD protocol.

Figure 4:
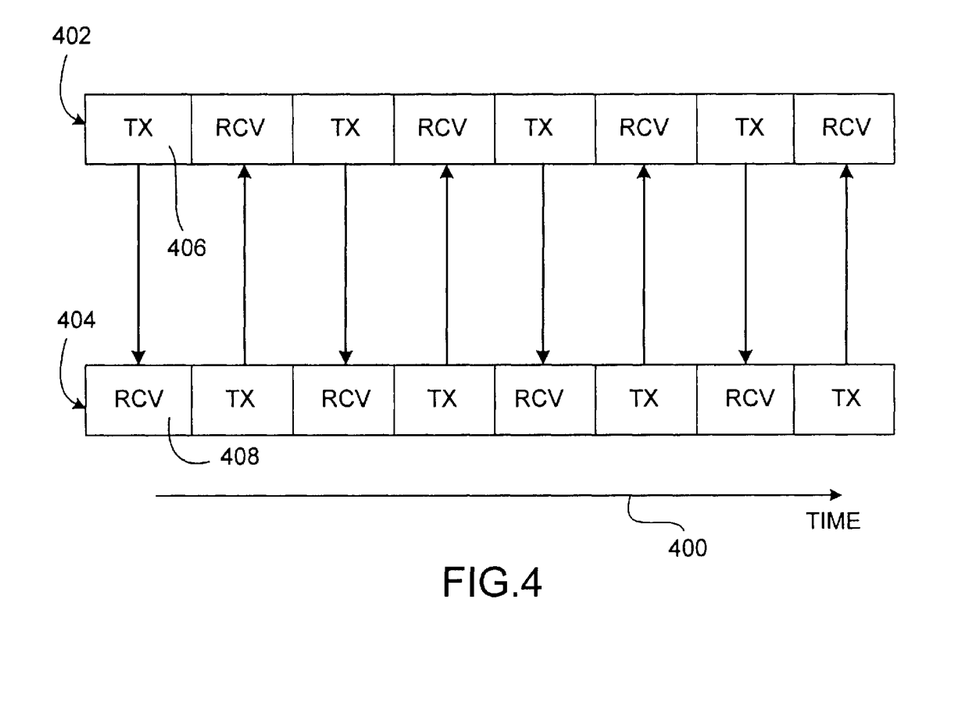
FIG. 4 is a diagram illustrating an example of a time division duplex information transfer between two TDD systems.

Referring now to FIG. 4, a diagram illustrating an example of a time division duplex information transfer between two TDD systems is provided. As time passes during the information transfer, as depicted by line 400, each of the TDD communication systems provides a series 402, 404 of alternating transmit (TX) and receive (RCV) modes. For example, while one communication device is transmitting at TX 406, another communication device is receiving the information at RCV 408. This rapid toggling between the receive and transmit modes allows each of the systems to transmit at the same frequency. The communications devices involved in the duplex communication synchronize to the timeslots created by this switching, so that one will be transmitting while the other is receiving.

The following description is directed to a mobile station handoff in a cellular network. However, the present invention is not limited to such handoffs, and is applicable for a communication handover between any FDD and TDD communication systems. For example, the present invention is also applicable to stationary systems where there is simultaneous communication in at least one duplex direction with both FDD and TDD systems. This may be desirable in certain situations, such as for load sharing purposes. The present invention is therefore applicable in cases of mobile station handoffs between FDD/TDD systems, or in stationary systems where the same information is simultaneously transmitted to/from both FDD/TDD systems for load sharing or other purposes. Therefore, while the present invention is particularly useful in the context of mobile station handoffs and is largely described in terms thereof, the present invention is not limited to mobile station handoffs.

Figure 5:
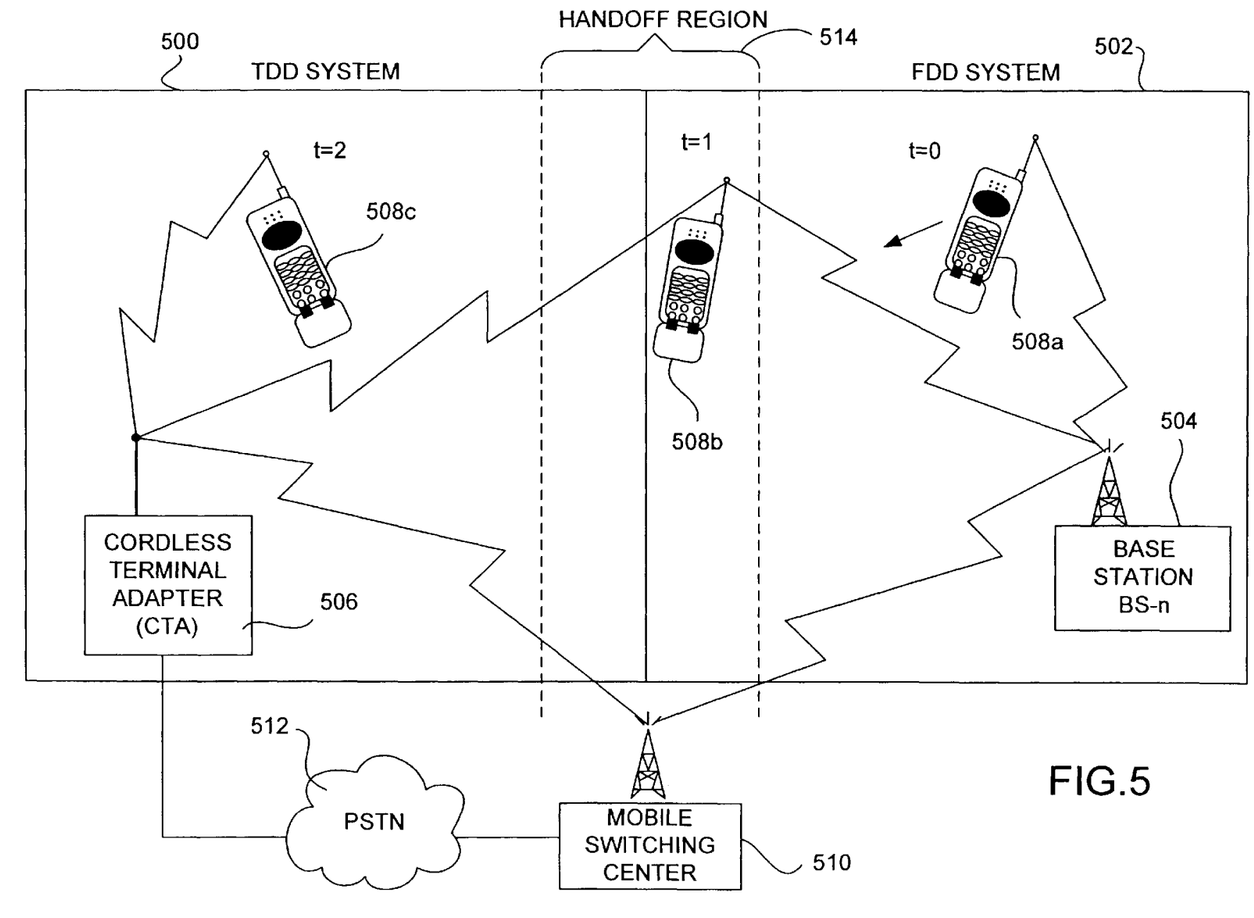
FIG. 5 is a diagram illustrating one embodiment of a duplex-to-duplex handoff as a mobile station moves from an FDD system to a TDD system.

Referring now to FIG. 5, a neighboring TDD system 500 and FDD system 502 are illustrated. The present invention relates to the implementation and control of information in a handoff between TDD and FDD systems, utilizing any multiple access scheme. While various multiple access schemes are possible, such as frequency division multiple access (FDMA), time division multiple access (TDMA) and code division multiple access (CDMA), the present invention is described, for purposes of example, in the context of a CDMA system. However, the present invention is capable of operation with other multiple access systems, and therefore should not be limited to the CDMA systems described in the following embodiments.

The embodiment of FIG. 5 illustrates an FDD system 502 such as a CDMA/FDD system typically used in an outdoor wireless arrangement. The TDD system 500 of FIG. 5 represents a CDMA/TDD system used in a relatively short-range indoor wireless arrangement. The FDD system 502 may employ a number of carriers at every base station 504, and when using each carrier it simultaneously occupies a first frequency $f_1$ for the information uplink, and a second frequency $f_2$ for the information downlink, as was described in connection with FIGS. 1 and 2. The TDD system 500, on the other hand, typically provides for communication with a local base station, such as the cordless terminal adapter (CTA) 506, at a common frequency F. It should be recognized that the FDD and TDD systems are not restricted to indoor-outdoor implementations. For example, TDD may be used in the same wireless cell site with FDD, but using a different frequency band.

A mobile station (MS) 508a at time t=0 in the FDD system 502 communicates with other mobile stations, or with the mobile switching center (MSC) 510, via the base station 504. The MSC 510 provides an interface to other networks, such as the public switched telephone network (PSTN) 512, integrated services digital networks (ISDN), and other data networks. As a user within the FDD system 502 moves closer to the TDD system 500, the MS 508b enters a handoff region 514 at time t=1. The handoff region 514, as will be described in further detail below, represents a region where support of an mobile station from one base station to another is transferred. As the MS 508c moves out of the handoff region 514 and completely within the TDD system 500 at time t=2, the MS 508c communicates via its supporting base station, illustrated as a local CTA 506. The CTA 506 can be networked to the PSTN 512 directly, or can alternatively use wireless means to communicate via the MSC 510.

Figure 6:
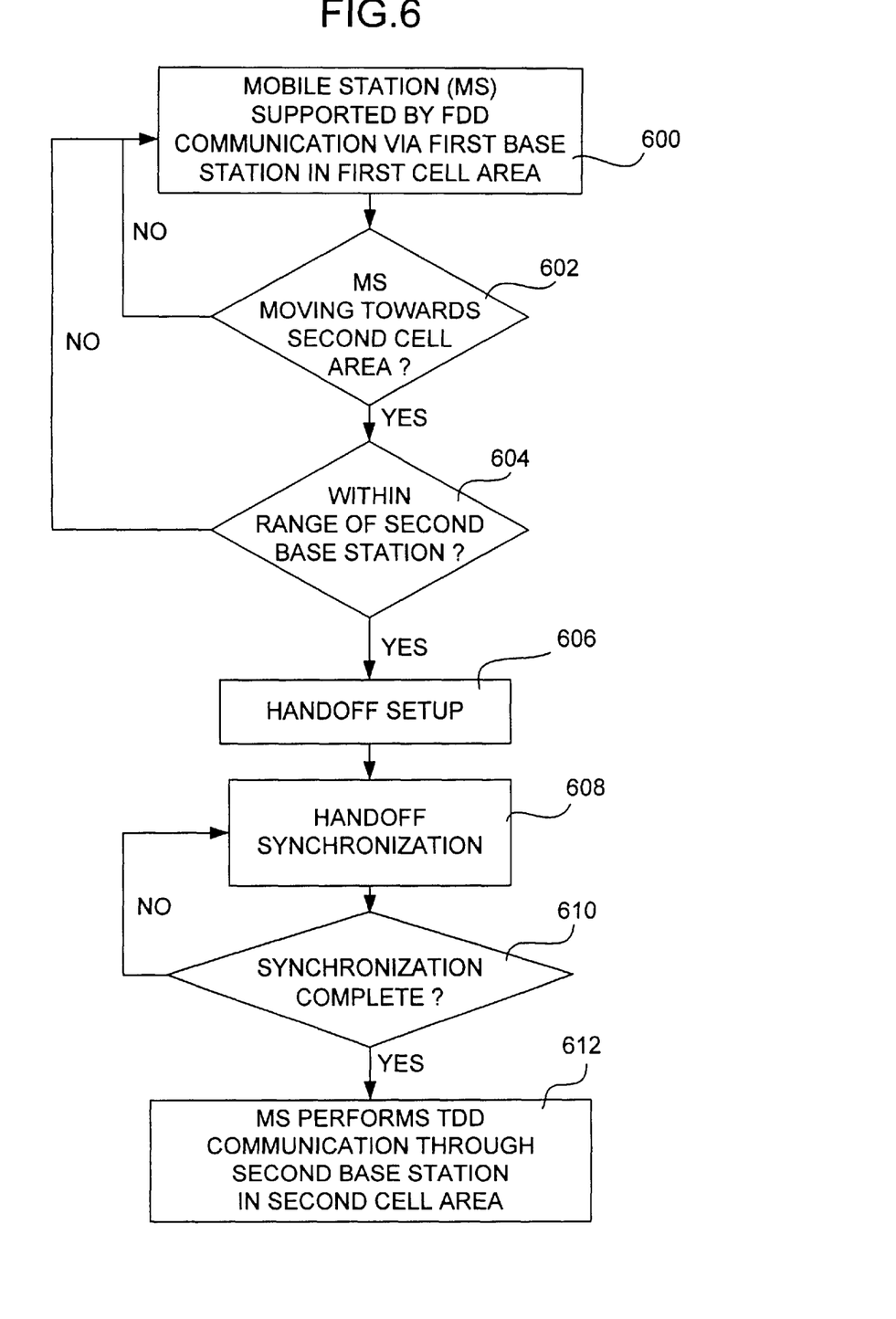
FIG. 6 is a flow diagram of one embodiment of a handoff procedure between a system supported by an FDD protocol and a system supported by a TDD protocol.

FIG. 6 is a flow diagram of one embodiment of a handoff procedure from a system supported by an FDD protocol to a system supported by a TDD protocol, as was described in connection with FIG. 5. A mobile station MS is supported 600 by FDD communication via a first base station BS in a first cell area. The mobile station therefore utilizes a pair of frequencies separated by a duplex band to perform duplex communications between the mobile station and the base station. Where the mobile station is stationary, or is not moving towards a second cell area as determined at block 602, the first base station continues to support the mobile station. Where the mobile station is moving 602 towards the second cell area, it is determined 604 whether the mobile station is within range of the second base station. In one embodiment of the invention, the first base station is a CDMA/FDD base station, and the second base station is a CDMA/TDD base station.

When it has been determined 604 that the mobile station has not moved within the range of the second base station, the first base station continues to support the mobile station. However, where the mobile station has moved to a point so as to be within the reach of the second base station, a handoff setup procedure is initiated 606. The handoff setup allows the mobile station to identify that it is within the handoff region, request a handoff, and receive acknowledgment to a handoff request. One embodiment of the handoff setup 606 is described in further detail in connection with FIG. 7.

The mobile station receives notification through a handoff request acknowledgment that a handoff will be permitted. The handoff is synchronized 608, which includes properly timing the information transfer throughout the handoff procedure. Handoff synchronization 608 continues until it is determined 610 that the synchronization is complete, at which time the mobile station entirely performs 612 the TDD communication through the second base station in the second cell area.

Figure 8:
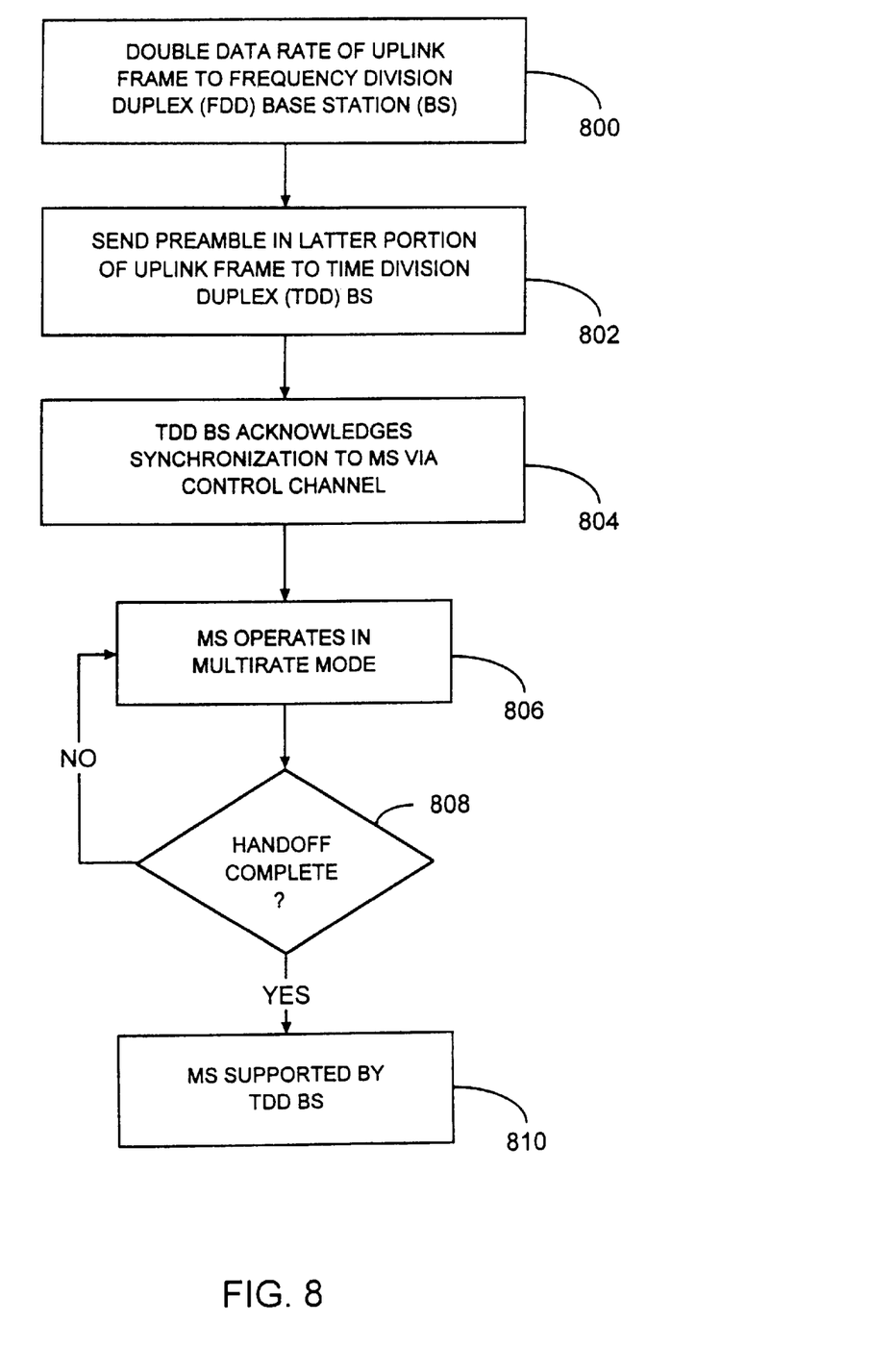
FIG. 8 is a flow diagram of an example of an FDD-to-TDD synchronization in accordance with the present invention.
Figure 9A:
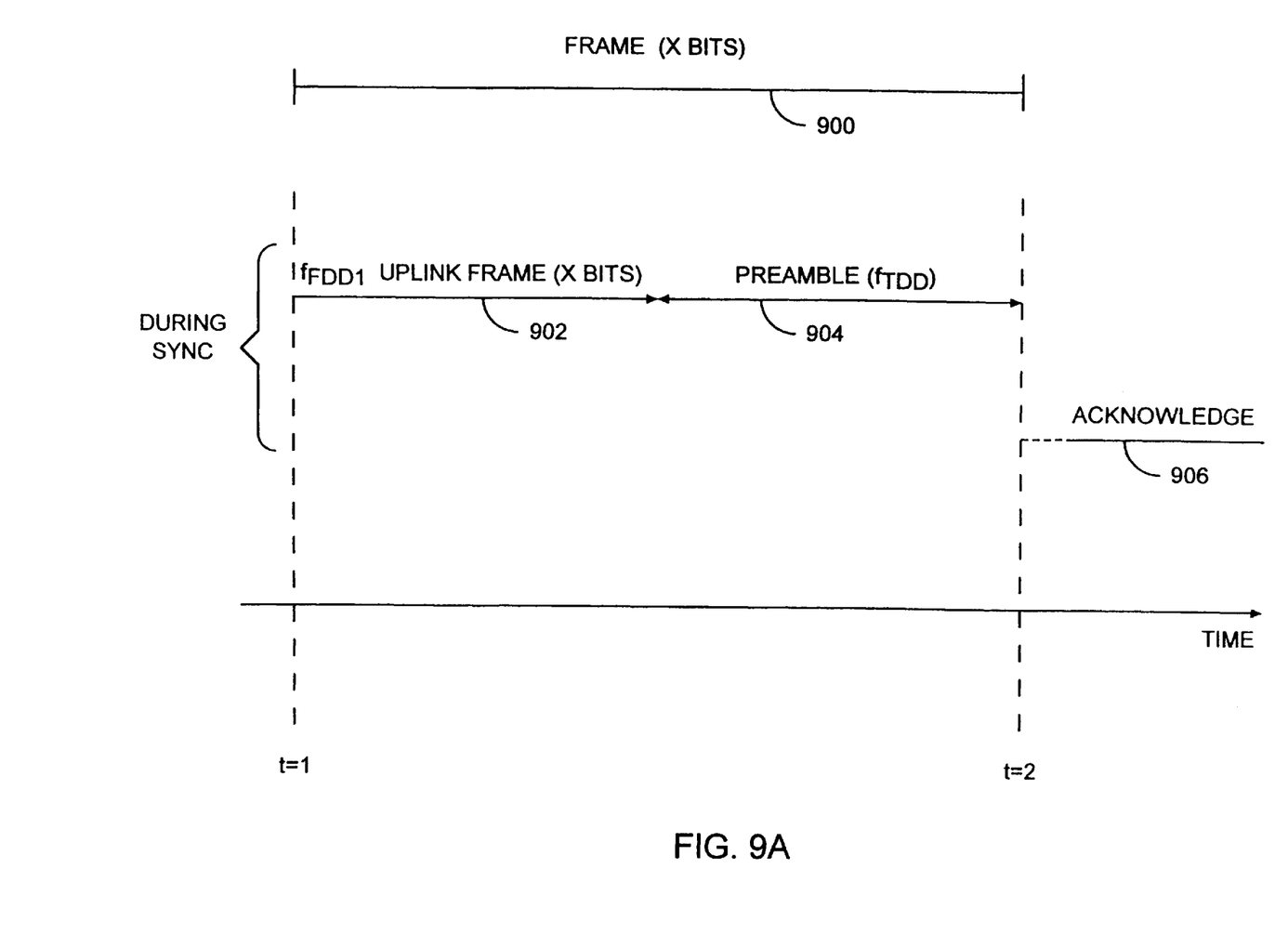
FIGS. 9A and 9B illustrate one embodiment of the synchronization and multirate operation implemented during a duplex-to-duplex handoff.
Figure 9B:
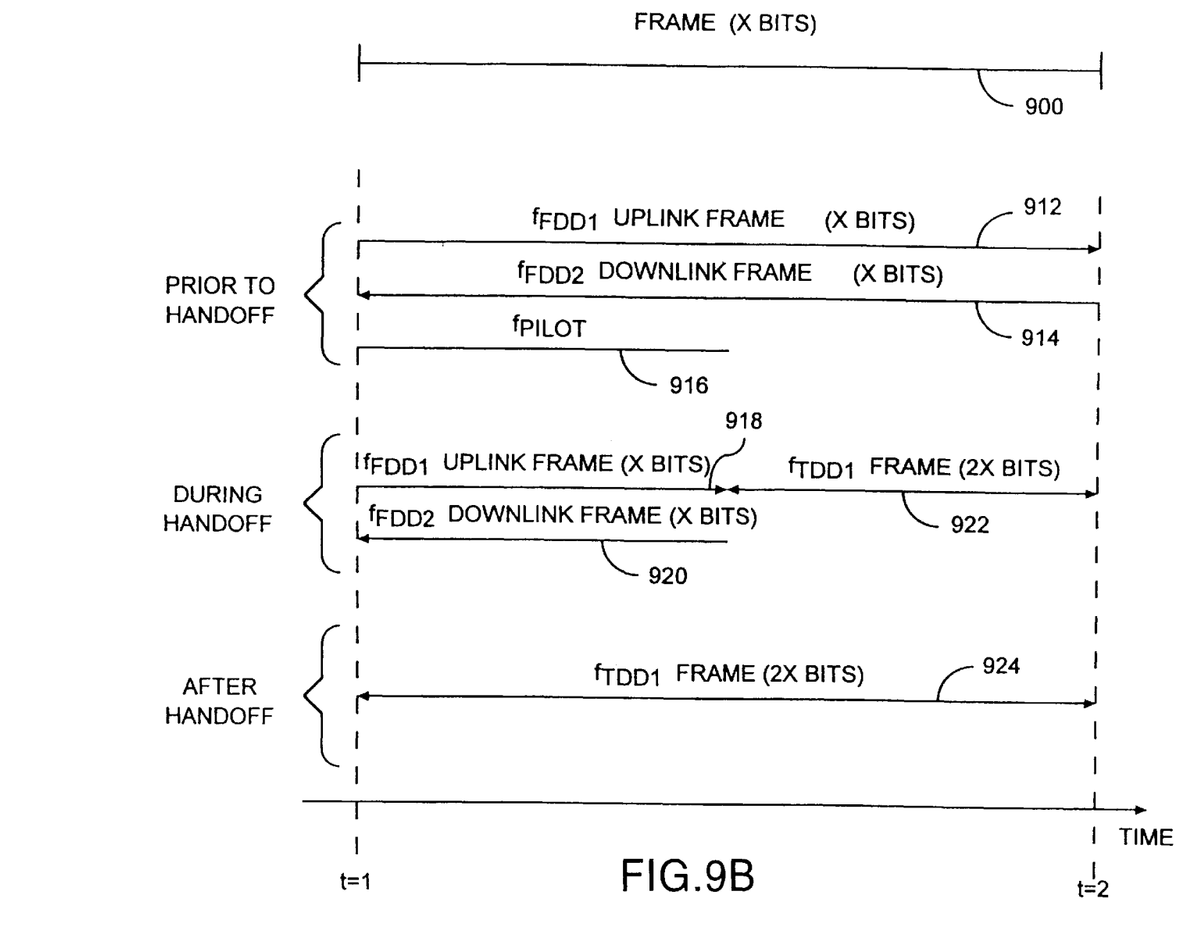

In one embodiment of the invention, the first cell area is an outdoor CDMA/FDD system, and the second cell area is an indoor CDMA/TDD system. The handoff occurs as the mobile station user moves from the outdoor system towards the indoor system. It should be recognized that the FDD and TDD systems can be co-located. The present invention also analogously provides for a handoff from the TDD to an FDD system, as will be readily apparent to those skilled in the art from the description provided herein. In order to minimize noise, distortion, and handoff failures, and to provide uninterrupted communication during handoff, a "soft" handoff is used. This is described in greater detail in connection with FIGS. 8 and 9.

Figure 7:
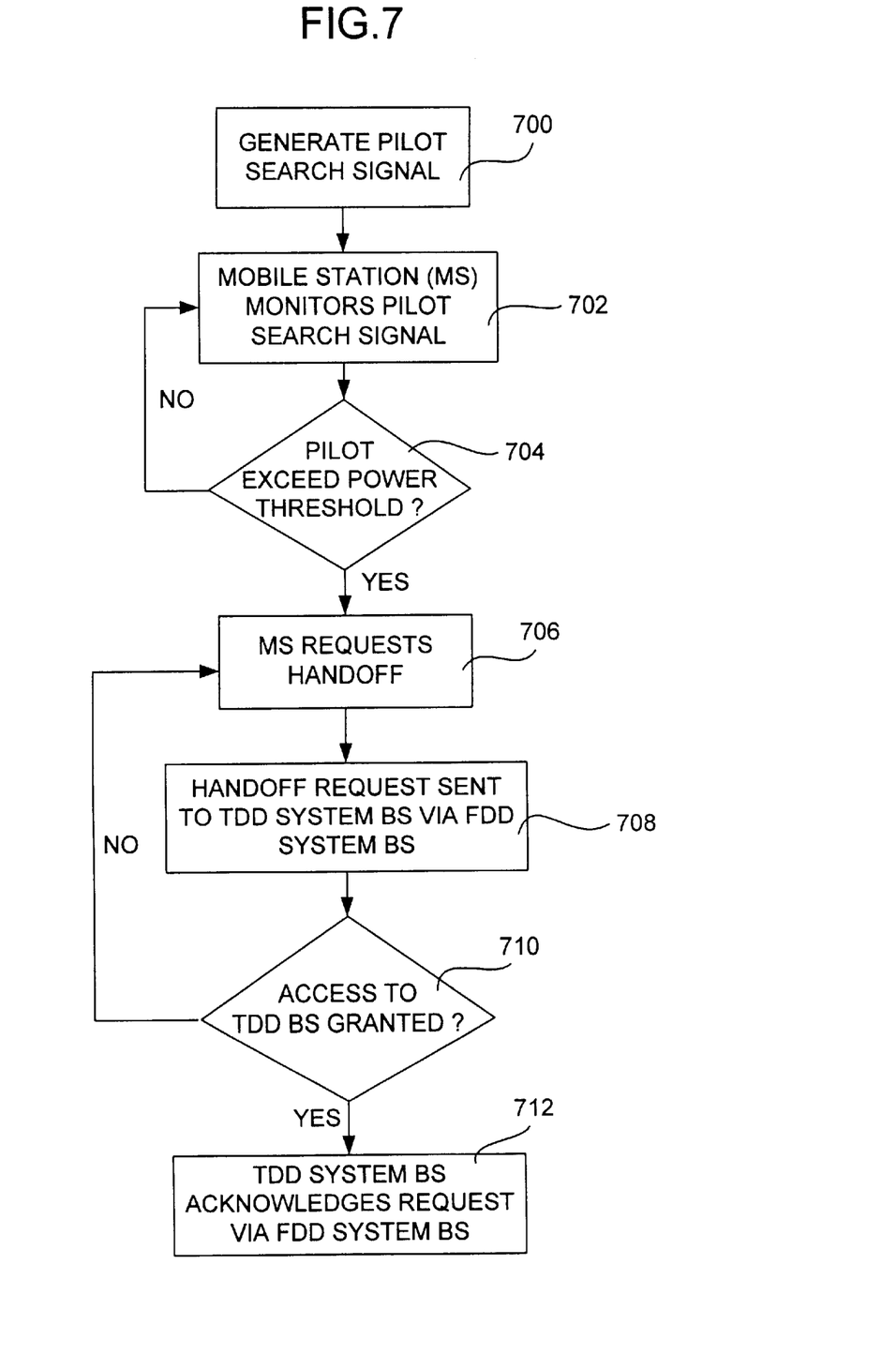
FIG. 7 is a flow diagram of one embodiment of a soft handoff setup in accordance with the present invention.

Referring now to FIG. 7, a flow diagram of one embodiment of a soft handoff setup is provided. A soft handoff is initiated by generating a pilot search signal 700 at the base station at which the mobile station is approaching. For example, in the present invention, an indoor TDD cordless terminal adapter generates a pilot search signal to be monitored by an approaching mobile station. The pilot signal is a predetermined signal that is broadcast from the base station. A mobile station, configured to receive the predetermined signal, will recognize the predetermined signal when it is within the physical operating range of the broadcasting base station. The particular pilot search signal can distinguish itself from other pilot signals by using a signal of a particular phase or frequency which differs from the phase or frequency of the other pilot signals.

The mobile station monitors 702 for the pilot search signal. In one embodiment of the invention, the mobile station monitors for a pilot signal that is sufficiently high in power, or alternatively where the path loss is small. If the pilot signal does not exceed the power threshold, the mobile station continues to monitor 702 the pilot search signal. One embodiment of the invention involves the use of a designated frequency by the TDD system which is also known by the mobile station. The mobile station then monitors for a pilot signal at this designated frequency. This monitoring may be accomplished using an additional receiver, or could be accomplished using time or frequency division multiplexing methods.

When the mobile station determines 704 that the pilot search signal has exceeded a predetermined power threshold, the mobile station requests 706 the handoff. The mobile station handoff request is sent 708 from the mobile station to the "new" base station via the base station currently supporting the mobile station. For example, where the mobile station is moving from an outdoor FDD system having an FDD base station towards an indoor TDD system having a TDD cordless terminal adapter (CTA), the request for handoff is sent to the TDD CTA from the FDD base station. The new base station (e.g., the TDD CTA) determines 710 whether or not to grant access to the new base station, based on desired parameters, such as load control. Generally, load control refers to the manner in which the communication system ensures quality connections for all users of the system. This can be performed in a variety of ways, including shifting some users to other frequencies or base stations, or restricting particular service options.

If the new base station does not recognize that the access parameters have been met, no handoff will be allowed, and the mobile station may again request 706 handoff. Otherwise, the TDD system base station acknowledges 712 the handoff request by way of an acknowledgment signal back to the mobile station through the FDD base station.

Once the handoff has been initiated, the handoff is synchronized to properly time the handoff at both the TDD and FDD systems. FIG. 8 is a flow diagram which provides an example of an FDD-to-TDD synchronization in accordance with the present invention. The first part of the uplink frame is sent with an increased data rate to the base station associated with the FDD system. In one embodiment, increasing the data rate involves doubling the data rate between the mobile station to the FDD system base station, as shown at block 800. The increased data rate allows the time that would normally be remaining to be used to provide a preamble to the TDD base station to initially synchronize a TDD data transfer, as seen at block 802. The preamble includes information for facilitating initial synchronization, and is sent in the latter portion of the uplink frame from the mobile station to the base station in the TDD system. The TDD base station acknowledges 804 the synchronization by returning an acknowledgment signal to the mobile station via a control channel known by the TDD base station and the mobile station.

When the synchronization has been established, the mobile station operates 806 in a multirate mode, where the data is sent to both duplex systems at a rate sufficient to allow the information to be sent to both systems in a period corresponding to one data frame. By increasing the data transfer rates in this manner, the same amount of information can be transmitted from the mobile station to each of the FDD/TDD systems as would be transmitted to either of the FDD/TDD systems individually when not in handoff mode. One example of such a multirate mode is illustrated and described in connection with FIG. 9B.

Until the handoff is complete, the mobile station will continue to operate 806 in the multirate mode. When it is determined 808 that the handoff is complete, the mobile station is completely supported 810 by the new base station, which is the TDD base station in the present example.

FIG. 9A illustrates one manner in which the handoff synchronization is initiated in accordance with the present invention. The information frame 900 is a group of X bits sent serially over a communication channel, and is shown between times t=1 and t=2, which is the normal time for one frame to be transmitted. In order to initiate the handoff procedure, the uplink frame ($f_{FDD1}$ in this example) is transmitted at an increased data rate to the FDD base station. In one embodiment of the invention, the data rate is doubled, which is represented on line 902. Line 902 approximately represents the transmission time for transmitting X bits during the uplink frame, which is approximately one-half of the time normally required to transmit a frame as depicted by line 900. Doubling the data rate at this phase allows the X bits in the uplink frame to be transmitted in approximately half the time.

The latter portion of the frame 900 is filled with preamble information which is sent to the "new" base station (e.g., the TDD base station in this example). The preamble includes information for facilitating initial synchronization, and is sent from the mobile station to the FDD base station. The preamble includes a synchronization field comprising a bit pattern, or training sequence, that is known to the receiver. This training sequence provides for initial synchronization with the new base station, and can assist in channel estimation and equalization. As seen by line 904, the latter portion of the frame is used to provide this preamble to the TDD communication system. The new base station acknowledges the synchronization to the mobile unit via a control channel, as depicted by the acknowledge signal on line 906.

Referring now to FIG. 9B, one embodiment of the multirate operation during duplex-to-duplex handoff is illustrated. The information frame 900 having a number X bits is depicted between times t=1 and t=2. Prior to handoff, an active mobile station communicates with its corresponding base station. For example, FIG. 9B shows that a mobile station may be communicating with a base station using an FDD protocol prior to handoff. This can be seen on lines 912 and 914, where information is provided from the mobile station to the base station on an uplink frame at a first frequency $f_{FDD1}$, and where information is provided from the base station to the mobile station on a downlink frame at a second frequency $f_{FDD2}$. The pilot search signal is sent at a frequency $f_{PILOT}$, represented on line 916, which is recognized by the mobile station when in proximity to the base station that is broadcasting the pilot search signal.

When the mobile station recognizes the pilot search signal and has established the initial synchronization as described in FIG. 9A, the mobile station will operate in multirate mode during the handoff. One example of the multirate mode is shown on lines 918, 920 and 922 of FIG. 9B. The $f_{FDD1}$ uplink frame on line 918, having a number X bits, is provided to the FDD base station at approximately twice the rate as it was provided prior to handoff shown on line 912. The $f_{FDD2}$ downlink frame on line 920 optionally has an increased data rate, thereby transmitting the X bits in a time approximately half of the time required to transmit the information prior to handoff as shown on line 914. The information is also transmitted in time division duplex at a frequency $f_{TDD1}$, as shown on line 922 which represents a frequency at which a time division duplexing protocol is used to communicate with the new base station. This is accomplished in a period of time corresponding to one half of one frame prior to the handoff; i.e., during the latter portion of the frame 900, which results in a 4-fold increase in data rate of the data rate of the original FDD signal on line 912. This is due to the reduced time allotted to transmit the data, and to the characteristics of TDD where both the uplink and downlink transmission occurs at a common frequency. When the handoff is complete, the information is transmitted via the new base station in the TDD system only, as shown on line 924. At this time, the multirate mode is disabled so that the 2× transmit and receive bits are transmitted at frequency $F_{TDD1}$ during the one frame time interval between time t=1 and t=2.

The establishment of the multirate mode, which provides for an increased transfer rate during handoff, can be realized using a data burst mode. A data burst mode refers to an increase of the data rate. For example, increasing the data rate is one manner in which the present invention creates a virtually simultaneous connection between the two duplex systems. By using the multirate mode described above, all of the bits are transmitted via the FDD system and the TDD system in the time period typically used only by the FDD system. Alternatively, a portion of the frame (i.e., less than all of the bits of the frame) can be sent in the $f_{FDD1}$ uplink frame (918 of FIG. 9B), and the remaining bits to a TDD system in the $f_{TDD1}$ frame (922 of FIG. 9B). In this case, the first portion (for example, half of the frame bits) are sent with the same rate as in FDD-only operation. However, the latter TDD portion is sent at double rate, since only half of the time is available to send the frame as compared to TDD-only operation.

The present invention therefore allows an established communication connection to be maintained with both the FDD and TDD communication systems during handoff. It is not necessary that the entire communication frame be sent to both the FDD and TDD communication systems. For example, a first half of the communication frame can be transmitted to the FDD system, and the second half of the communication frame can be transmitted to the TDD system. The FDD system can operate at its normal rate, and the TDD system can operate at double rate such that the entire communication frame is transmitted by the cooperative aggregation of the FDD and TDD communication systems. In this example, the first half of the frame is sent only to the FDD system, and the second half is sent only to the TDD system, and the entire communication frame is recreated at the receiving end. Where such "subframes" are transmitted, different frequencies may be used to transmit selected groups of the subframes. For example, a first number of the subframes can be transmitted in a different frequency than the rest of the subframes. The frequency can be changed in accordance with a predetermined pattern (i.e., frequency hopping).

Alternatively, where the entire communication frame is to be sent to both the FDD and TDD communication systems, the data transfer rate must be further increased; e.g., double the rate with respect to the FDD communication system and quadruple the rate with respect to the TDD communication system.

The present invention is also applicable in non-handoff situations. For example, a terminal such as a mobile station (MS) may be relatively stationary, meaning that it is not being moved through a handoff region such as handoff region 514 of FIG. 5. Rather, the MS in this embodiment may be in use at a certain location, such as within the FDD system or within the TDD system. The invention is very beneficial for purposes other than FDD/TDD handoff, such as for load sharing between FDD and TDD systems.

In such a case, the present invention utilizes the previously-described techniques to effect simultaneous communication in at least one duplex direction between the MS and each of the FDD and TDD systems. For example, assume a terminal using a 4 MHz FDD downlink band can normally achieve a 1 Mbps data rate. By directing an additional 500 Kbps of data via the TDD system a total of 1.5 Mbps can be achieved.

The manner in which the information is divided between the FDD and TDD systems can be determined as the situation requires. For example, all of the data could be delivered via the TDD downlink while using the FDD uplink for control. This "control" includes control signals for transmission parameters, such as transmission rate control signals, power control signals, modulation control signals, and encoding control signals. This arrangement can be used to occasionally increase the downlink capacity, or alternatively could be used for load sharing purposes. Such use requires essentially simultaneous transmission/reception using both the TDD and FDD systems, and would utilize a multirate mode as previously described.

It should be recognized that the embodiments described above are illustrative, and not to be limited thereto. For example, as will be readily apparent to those skilled in the art from the foregoing description, a handoff from a TDD system to an FDD system can also be accomplished. A handoff would be initiated as a mobile station moves from the TDD system to the FDD system by monitoring the pilot search signal of the FDD system. When the pilot search signal is at a sufficient level, the mobile station requests the handoff, which can be granted by the FDD system. The handoff is synchronized by increasing the data rate of the TDD uplink frame, and a preamble will be sent in the latter portion of the frame to the FDD system to establish frequency division duplex communication. The FDD base station will acknowledge this synchronization, at which time the mobile station begins operating in a multirate mode, where it communicates information with the TDD system and FDD system concurrently.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling mobile unit communication handoffs between a frequency division duplex (FDD) communication system and a time division duplex (TDD) communication system, the method comprising:

transmitting between the mobile unit and a current one of the FDD and TDD communication systems while moving towards a targeted one of the FDD and TDD communication systems, the current communication system being different from the targeted communication system;

generating a pilot search signal corresponding to a transmission range of the targeted communication system;

monitoring pilot search signals at designated frequencies using one of time division processing and frequency division processing;

initiating the communication handoff from the current communication system to the targeted communication system when the mobile unit recognizes a predetermined threshold level of the pilot search signal;

synchronizing concurrent communications between the mobile unit and both the current and targeted communications systems; and terminating transmission between the mobile unit and the current communication system and maintaining communication between the mobile unit and the targeted communication system when synchronization is complete.

2. The method as in claim 1, wherein the current communication system is the FDD communication system, and the targeted communication system is the TDD communication system.

3. The method as in claim 1, wherein the current communication system is the TDD communication system, and the targeted communication system is the FDD communication system.

4. The method as in claim 1, wherein initiating the communication handoff comprises requesting a handoff by the mobile unit when the mobile unit recognizes the predetermined threshold level of the pilot search signal.

5. The method as in claim 4, wherein requesting a handoff by the mobile unit comprises notifying the current communication system of the handoff request, and providing the handoff request to the targeted communication system via the current communication system.

6. The method as in claim 5, further comprising determining whether to grant access to the mobile unit at the targeted communication system based on predetermined parameters, and providing an acknowledge signal from the targeted communication system to the mobile unit via the current communication system when warranted by the predetermined parameters.

7. The method as in claim 6, wherein determining whether to grant access to the mobile unit based on predetermined parameters comprises analyzing load control parameters.

8. The method as in claim 1, wherein synchronizing concurrent communications between the mobile unit to both the current and targeted communications systems comprises:
increasing a data rate in an uplink frame between the mobile unit and the current communications system; and
transmitting a synchronizing preamble to the targeted communications system during a remaining portion of the uplink frame made available by the increased data rate.

9. The method as in claim 8, wherein increasing the data rate comprises approximately doubling the data rate between the mobile unit and the current communications system.

10. The method as in claim 8, further comprising acknowledging synchronization to the mobile unit by the targeted communication system.

11. The method as in claim 10, wherein acknowledging synchronization comprises providing an acknowledge signal to the mobile unit via a control channel.

12. The method as in claim 10, further comprising operating in a multirate mode upon the synchronization acknowledgment, wherein the multirate mode comprises transmitting the information to the current communication system at an increased data rate in the uplink frame between the mobile unit and the current communications system, and transmitting the information to the targeted communication system at an increased data rate in a remaining portion of the uplink frame between the mobile unit and the targeted communications system.

13. A method for controlling mobile unit communication handoffs from a frequency division duplex (FDD) communication system to a time division duplex (TDD) communications system, wherein the mobile unit is transmitting information via the FDD communications system, the method comprising:
generating a pilot search signal corresponding to a transmission range of the TDD communication system;
initiating the communication handoff from the FDD communication system to the TDD communication system when the mobile unit recognizes a predetermined threshold level of the pilot search signal;
synchronizing concurrent communications between the mobile unit to both the FDD and TDD communications systems;
transmitting the information in a multirate mode upon acknowledgment of the synchronization by the TDD communication system, including communicating the information with the FDD communication system at an increased FDD data rate in the uplink frame between the mobile unit and the FDD communications system, and communicating the information with the TDD communication system at an increased TDD data rate in a remaining portion of the uplink frame between the mobile unit and the TDD communications system; and
terminating transmission between the mobile unit and the FDD communication system and maintaining communication between the mobile unit and the TDD communication system when the synchronization is complete.

14. The method as in claim 13, wherein synchronizing concurrent communications between the mobile unit to both the FDD and TDD communications systems comprises:
increasing the FDD data rate in an uplink frame between the mobile unit and the FDD communications system; and
transmitting a synchronizing preamble to the TDD communications system during a remaining portion of the uplink frame made available by the increased FDD data rate.

15. The method as in claim 14, wherein increasing the FDD data rate during synchronization comprises approximately doubling the FDD transmit data rate between the mobile unit and the FDD communications system.

16. The method as in claim 14, further comprising acknowledging synchronization to the mobile unit by the TDD communication system.

17. The method as in claim 13, wherein communicating the information to the FDD communication system at an increased FDD data rate comprises transmitting the information at approximately double the FDD transmit data rate.

18. The method as in claim 13, wherein communicating the information to the TDD communication system at an increased TDD data rate comprises transmitting the information at approximately quadruple the FDD transmit data rate.

19. The method as in claim 13, wherein the information is communicated by the mobile unit using CDMA.

20. A method for controlling mobile unit communication handoffs from a time duplex (TDD) communication system to a frequency division duplex (FDD) communications system, wherein the mobile unit is transmitting information via the TDD communications system, the method comprising:
generating a pilot search signal corresponding to a transmission range of the FDD communication system;
initiating the communication handoff from the TDD communication system to the FDD communication system when the mobile unit recognizes a predetermined threshold level of the pilot search signal;
synchronizing concurrent communications between the mobile unit to both the TDD and FDD communications systems;
transmitting the information in a multirate mode upon acknowledgment of the synchronization by the FDD communication system, including communicating the information with the TDD communication system at an increased TDD data rate in the uplink frame between the mobile unit and the TDD communications system, and communicating the information with the FDD communication system at an increased FDD data rate in a remaining portion of the uplink frame between the mobile unit and the FDD communications system; and
terminating transmission between the mobile unit and the TDD communication system and maintaining communication between the mobile unit and the FDD communication system when the synchronization is complete.

21. The method as in claim 20, wherein synchronizing concurrent communications between the mobile unit to both the TDD and FDD communications systems comprises:
increasing the TDD data rate in an uplink frame between the mobile unit and the TDD communications system; and
transmitting a synchronizing preamble to the FDD communications system during a remaining portion of the uplink frame made available by the increased TDD data rate.

22. The method as in claim 20, wherein the information is communicated by the mobile unit using CDMA.

23. A system for managing mobile unit communication handoffs between a frequency division duplex (FDD) communication system and a time division duplex (TDD) communication system, the system comprising:
an FDD base station within the FDD communication system for communicating with the mobile unit in frequency division duplex mode, and for generating a pilot search signal corresponding to a transmission range of the FDD communication system;
a TDD base station within the TDD communication system for communicating with the mobile unit in time division duplex mode, and for generating a pilot search signal corresponding to a transmission range of the TDD communication system;
a mobile unit which is transmitting information via a current one of the FDD and TDD communication systems while moving towards the other, or targeted one of the FDD and TDD communication systems, the mobile unit comprising:
a receiving unit to receive the first and second pilot search signals, and to initiate a handoff from the current communication system to the targeted communication system when the pilot search signal from the targeted communication system has reached a predetermined threshold level; and
a dual-transceiver to synchronize concurrent communications between the mobile unit and the current and targeted communication systems, and to concurrently communicate the information with the current communication system and the targeted communication system upon synchronization, wherein the dual-transceiver comprises a burst mode capable of increasing a data rate between the mobile unit and the current and targeted communication systems during the handoff to concurrently support communication with both the current and targeted communications systems.

24. A method for maintaining a connection between a frequency division duplex (FDD) communication system and a time division duplex (TDD) communication system during handoff of a communication unit from one communication system to the other, the method comprising:
transmitting a first portion of a communication frame to one of the FDD and TDD communication systems;
transmitting a second portion of the communication frame to the other one of the FDD and TDD communication systems;
transmitting at least one of the first and second portions of the communication frame at an increased data rate; and
wherein communication occurs with both the FDD and TDD systems during the transmission of the communication frame, and wherein the communication occurs in a time equivalent to the time required to transmit the communication frame to either of the FDD and TDD systems when no handoff is occurring.

25. The method as in claim 24, wherein:
transmitting the first portion of the communication frame comprises transmitting all of the communication frame to one of the FDD and TDD communication systems;
transmitting the second portion of the communication frame comprises transmitting all of the communication frame to the other one of the FDD and TDD communication systems; and
transmitting at least one of the first and second portions of the communication frame at an increased data rate comprises transmitting both the first and second portions of the communication frame at an increased data rate such that all of the communication frame is transmitted to both the FDD and TDD systems in a time equivalent to the time required to transmit the communication frame to either of the FDD and TDD systems when no handoff is occurring.

26. The method as in claim 25, wherein transmitting both the first and second portions of the communication frame at an increased data rate comprises:
transmitting the first portion of the communication frame to the FDD communication system at a double rate; and
transmitting the second portion of the communication frame to the TDD communication system at a quadruple rate.

27. The method as in claim 24, wherein a first portion of the communication frame is sent only to one, but not the other, of the FDD and TDD systems, and a second portion of the communication frame is sent only to the other of the FDD and TDD systems.

28. The method as in claim 27, wherein the communication frame is received and reconstructed by combining the first and second portions of the communication frames sent to the FDD and TDD systems.

29. The method as in claim 27, wherein:
transmitting the first portion of the communication frame comprises transmitting a first half of the communication frame to one of the FDD and TDD communication systems;
transmitting the second portion of the communication frame comprises transmitting a second half of the communication frame to the other one of the FDD and TDD communication systems; and
transmitting at least one of the first and second portions of the communication frame at an increased data rate comprises transmitting the second half of the communication frame at an increased data rate such that the first half of the communication frame is transmitted to the FDD system at a non-increased data rate, and the second half of the communication frame is transmitted to the TDD system at a double data rate.

30. The method as in claim 27, wherein a first number of subframes of the communication frame is sent only to one, but not the other, of the FDD and TDD systems, and a second number of subframes of the communication frame is sent only to the other of the FDD and TDD systems.

31. The method as in claim 30, wherein at least one of the first number of subframes is transmitted in a different frequency than the other ones of the subframes.

32. The method as in claim 31, wherein the frequency is changed using a predetermined pattern.

33. The method as in claim 24, wherein the FDD and TDD communication systems operate in different frequency bands.

34. The method as in claim 24, wherein the FDD and TDD communication systems are co-located and operate in different frequency bands.

35. The method as in claim 24, wherein the FDD and TDD communication systems operate at least partly in a common frequency band.

36. The method as in claim 24, wherein the handoff is requested by a mobile station in a cellular network.

37. A method for controlling information transmissions between a communications unit and frequency division duplex (FDD) and time division duplex (TDD) communication systems, wherein the communication unit is transmitting information via a first one of the FDD and TDD communication systems, the method comprising:

generating a cell identification signal corresponding to a transmission range of a second one of the FDD and TDD communication systems;

initiating substantially simultaneous communication between the communications unit and both the FDD and TDD communications systems when the communications unit acknowledges the cell identification signal and is thereby in the coverage area of both the FDD and TDD communications systems; and maintaining the substantially simultaneous communication between the communications unit and each of the FDD and TDD communications systems by simultaneously communicating at least a part of the information with each of the FDD and TDD communications systems.

38. The method of claim 37, wherein simultaneously communicating at least a part of the information with each of the FDD and TDD communications systems comprises operating in a multirate mode such that an information transfer rate during the simultaneous communication of the information with each of the FDD and TDD communications systems is greater than the information transfer rate associated with only FDD information transmissions or only TDD information transmissions.

39. The method of claim 37, wherein simultaneously communicating at least a part of the information with each of the FDD and TDD communications systems comprises simultaneously transmitting different portions of the information via the FDD and TDD communications systems respectively to provide for load sharing.

40. The method of claim 37, wherein simultaneously communicating at least a part of the information with each of the FDD and TDD communications systems comprises simultaneously transmitting data via the TDD communications system while transmitting control signals via the FDD communications system.

41. The method of claim 40, wherein the control signals are selected from the group of transmission rate control signals, power control signals, modulation control signals, and encoding control signals.

42. A method for controlling mobile unit communication handoffs between a frequency division duplex (FDD) communication system and a time division duplex (TDD) communication system, the method comprising:

transmitting between the mobile unit and a current communication system;

generating a pilot search signal corresponding to a transmission range of a targeted communication system, the current communication system being different from the targeted communication system;

monitoring pilot search signals at designated frequencies using one of time division processing and frequency division processing;

initiating a communication handoff from the current communication system to the targeted communication system when the mobile unit recognizes a predetermined threshold level of the pilot search signal;

transmitting a synchronizing preamble to the targeted communication system in a portion of a frame to synchronize concurrent communications between the mobile unit and both the current and targeted communication systems; and terminating transmission between the mobile unit and the current communication system and maintaining communication between the mobile unit and the targeted communication system when synchronization is complete.

43. The method as in claim 42, wherein the current communication system is the FDD communication system and the targeted communication system is the TDD communication system.

44. The method as in claim 42, wherein the current communication system is the TDD communication system and the targeted communication system is the FDD communication system.

45. A method for controlling mobile unit communication handoffs between a frequency division duplex (FDD) communication system and a time division duplex (TDD) communication system, the method comprising:

transmitting between the mobile unit and the FDD communication system;

generating a pilot search signal corresponding to a transmission range of the TDD communication system;

monitoring pilot search signals at designated frequencies using time division processing;

initiating a communication handoff from the FDD communication system to the TDD communication system when the mobile unit recognizes a predetermined threshold level of the pilot search signal;

synchronizing concurrent communications between the mobile unit and both the FDD and TDD communication systems; and terminating transmission between the mobile unit and the FDD communication system and maintaining communication between the mobile unit and the TDD communication system when synchronization is complete.

46. A method for controlling mobile unit communication handoffs between a time division duplex (TDD) communication system and a frequency division duplex (FDD) communication system, the method comprising:

transmitting between the mobile unit and the TDD communication system;

generating a pilot search signal corresponding to a transmission range of the FDD communication system;

monitoring pilot search signals at designated frequencies using frequency division processing;

initiating a communication handoff from the TDD communication system to the FDD communication system when the mobile unit recognizes a predetermined threshold level of the pilot search signal;

synchronizing concurrent communications between the mobile unit and both the FDD and TDD communication systems; and terminating transmission between the mobile unit and the TDD communication system and maintaining communication between the mobile unit and the FDD communication system when synchronization is complete.

* * * * *